April 3, 1956 — G. M. FLEMING — 2,740,919
ELECTRON LENS

Filed June 25, 1953 — 4 Sheets-Sheet 1

INVENTOR
Gertrude M. Fleming
BY
Pennie, Edmonds, Morton, Barrows & Taylor
ATTORNEYS April 3, 1956  G. M. FLEMING  2,740,919
ELECTRON LENS
Filed June 25, 1953  4 Sheets-Sheet 2

INVENTOR
Gertrude M. Fleming
BY
ATTORNEYS

April 3, 1956

G. M. FLEMING 2,740,919

ELECTRON LENS

Filed June 25, 1953

INVENTOR
Gertrude M. Fleming
BY
Pennie, Edmonds, Morton, Barrows Taylor
ATTORNEYS

April 3, 1956

G. M. FLEMING

ELECTRON LENS 2,740,919

Filed June 25, 1953

INVENTOR
Gertrude M. Fleming

United States Patent Office 2,740,919
Patented Apr. 3, 1956

2,740,919

ELECTRON LENS

Gertrude M. Fleming, Yellow Springs, Ohio, assignor to Farrand Optical Co., Inc., New York, N. Y., a corporation of New York Application June 25, 1953, Serial No. 364,001

31 Claims. (Cl. 315—15)

This invention relates to electron lenses of the electrostatic type and more particularly to electron lenses of this type having negative spherical aberration, and to combinations of such lenses with electrostatic lenses having the usual positive spherical aberration, the combination as a whole exhibiting substantially zero spherical aberration.

The correction of electrostatic lenses of the usual type including three apertured diaphragm electrodes has been thought to be impossible because such lenses are converging and undercorrected for spherical aberration regardless of the sign of the potential difference between the center and the end electrodes. With such an undercorrected lens extra-axial rays are brought to a focus closer to the lens than are paraxial rays. Only by means of asymmetrical or pulsed fields operating differentially on paraxial and extra-axial rays has it been thought possible to correct an electrostatic lens for spherical aberration.

I have discovered that a three-electrode electrostatic lens of the apertured diaphragm-type may be converted into a lens having negative spherical aberration, i. e. overcorrected characteristics, by covering the apertures in one or both of the end diaphragm electrodes with electrically conductive electron transparent films or with fine mesh metallic screens and by operating the center electrode of such a lens at a positive potential with respect to the end electrodes. The present invention thus provides for the first time, so far as I am aware, an electrostatic lens having negative spherical aberration.

According to another aspect of my invention I provide a corrected electrostatic lens free from spherical aberration by combining a lens having undercorrected spherical aberration with a lens as above described having overcorrected spherical aberration. The undercorrected lens is typically a convergent three-electrode apertured diaphragm lens such as might be employed as the objective in an electron microscope for example, and the overcorrected or "correcting" lens is dimensioned to permit it to exhibit, with suitable applied voltage, a negative spherical aberration equal in magnitude but opposite in sign to that of the convergent lens. It turns out fortunately that the correcting lens can be made to compensate for the spherical aberration of the convergent lens without great effect on the focal length or magnification thereof.

In one preferred embodiment of the corrected lens combination according to the invention, the under- and overcorrected lenses are positioned as close together axially as possible by condensing their adjacent end electrodes into a single electrode common to both, the conductive film or screen being applied to this electrode. Similar screens may be applied to both end electrodes of the correcting component and may indeed be applied to both end electrodes of the convergent component also. The invention however also comprises corrected combinations of electrostatic lenses in which the two lenses are physically distinct from each other, each including three apertured diaphragm-type electrodes but with a conducting film or screen over the aperture of at least one of the end electrodes in the correcting component. The correcting component may be recognized as the smaller of the two components as is required for a balancing of the spherical aberration contributions of the two.

As applied to the provision of corrected electron lens combinations the invention is thus in certain respects comparable to the discovery in light optics that a lens having overcorrected spherical aberration can be used to correct a lens having undercorrected spherical aberration. A significant distinction between the two cases lies however in the fact that in the electronic case correction is achieved with an overcorrected lens of much less comparable power than in the case of light optics.

The invention will now be further described by reference to the accompanying drawings in which.

The present invention in both of its separate aspects illustrated in Figs. 1–5 and 6–10 has resulted from an extensive search for a method and means which would permit correction of the spherical aberration of electrostatic lenses, which aberration presently constitutes the limiting factor on the resolution obtainable in electrostatic electron microscope instruments. Upon a study of the hyperboloidal potential field, $$V = k\left(z^2 - \frac{r^2}{2}\right) \quad (1)$$

suggested as suitable for an electrostic lens in U. S. Patent No. 2,520,813, I found that an ideal lens producing such a field and bounded by hyperboloidal end electrodes would exhibit overcorrection of spherical aberration when operated as a divergent lens with a positive potential on the center electrode with reference to the end electrodes. The lenses of the present invention do not however employ hyperboloidal electrodes and do not produce hyperboloidal potential fields.

Figure 12:
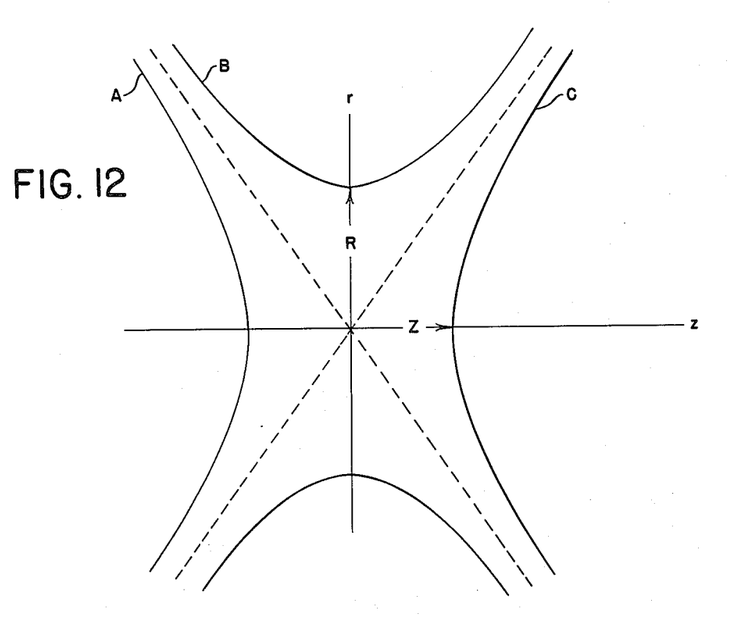
Fig. 12 is a diagram illustrating an ideal hyperbolic lens.

Such an ideal lens is illustrated in Fig. 12. It consists of three electrodes having equipotential surfaces in the form of hyperboloids of revolution. Two of these electrodes must be not only hyperboloidal in shape and electrically conducting but also electron transparent. Accordingly such ideal lenses cannot be readily realized in physical form. It is impractical to form electrodes of any type with hyperboloidal surfaces, and it has so far at any rate proved impossible to make them at once hyperboloidal right across the lens axis, electrically conducting and electron transparent as the end electrodes of such an ideal lens would have to be. I have however found that a three-electrode apertured diaphragm lens when provided with substantially plane electron transparent conducting films or screens across one or both of its end electrode apertures combines a property of substantial negative spherical aberration with very low vergency, when the center electrode is maintained at a suitable low positive potential with respect to the end electrodes. With higher voltages of this sign, the lens can however be made to show substantial negative power. Examples of such overcorrected lenses according to my invention are illustrated in Figs. 1–4.

Figure 1:
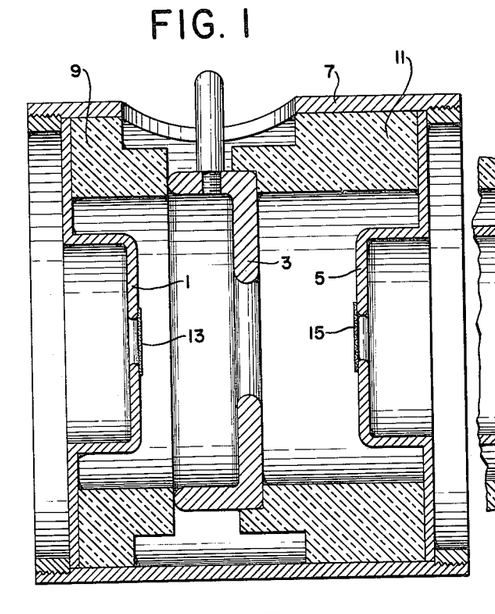
Fig. 1 is an axial section through an overcorrected electron lens according to one embodiment of the invention.

The overcorrected lens of Fig. 1 comprises electrodes 1, 3 and 5 supported in a lens cell 7. The three electrodes are of the apertured diaphragm type and are supported with their apertures in coaxial relation. The middle electrode rests on rings 9 and 11 of insulating material whereas the end electrodes are in electrically continuous relation with each other and with the lens cell 7. According to the invention the lens is made capable of exhibiting spherical overcorrection by the provision of fine mesh screens 13 and 15 across the apertures of the end electrodes 1 and 5. These are metallic screens whose mesh size is small by comparison with the smallest diaphragm aperture of any of the electrodes 1, 3 and 5. Screens with mesh size of from 700 to 1,000 openings per inch have been successfully employed on lenses whose minimum electrode apertures were of the order of 0.1 inch. The screens 13 and 15 should be flat, perpendicular to the lens axis, and are supported in electrically conducting relation with the electrodes on which they rest by means of a conductive adhesive material for example.

The lens of Fig. 1 is diverging in character and overcorrected for spherical aberration when operated with a positive potential on its electrode 3 by reference to its electrodes 1 and 5.

Figure 2:
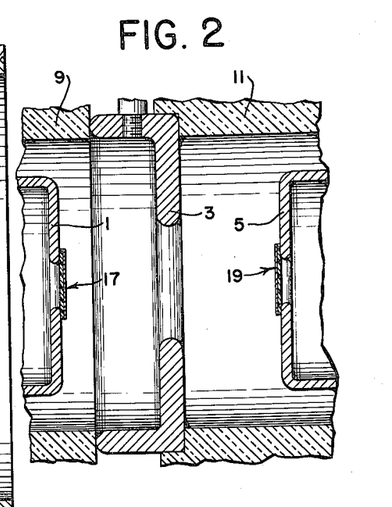
Fig. 2 is a fragmentary axial section through an overcorrected electron lens according to another embodiment of the invention.

Another overcorrected lens according to the invention is illustrated in Fig. 2 which is similar to the lens of Fig. 1 except that there are provided in place of the fine mesh metallic screens 13 and 15 continuous metallic films 17 and 19 which are electron transparent. As illustrated at an enlarged scale in Fig. 5 the film 17 and similarly the film 19 comprises a very thin layer 20 of a metal such as titanium evaporated onto a thin collodion layer 21 which is supported over the aperture of the end diaphragm 1. By means of a conducting adhesive or otherwise, electrical continuity is insured between the diaphragm electrode and the metallic layer 20.

In both of the embodiments of Figs. 1 and 2, by means of the electrically continuous electron transparent films or screens employed, the equipotential surfaces of the diaphragm electrodes to which they are applied are made to extend substantially across the lens axis, and the adjacent equipotential surfaces within the lens spaces are themselves made substantially perpendicular to the lens axis so that the radial component of the field strength in the vicinity of the electrodes so modified is either suppressed or minimized. As here used, the term "electrically continuous" means that in the case of the fine mesh screens for example the electrical discontinuities are at most small by comparison with the smallest aperture of any of the apertured diaphragm electrodes of the lens.

I have found that lenses exhibiting overcorrected spherical aberration properties may be produced with an electrically continuous conducting film or screen over one end electrode only. Such lenses of the fine mesh screen and evaporated film types are illustrated in Figs. 3 and 4 respectively.

Figure 3:
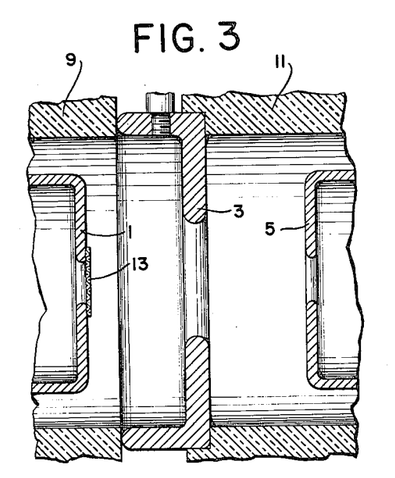
Fig. 3 is a fragmentary axial section through an overcorrected electron lens according to still another embodiment of the invention.
Figure 4:
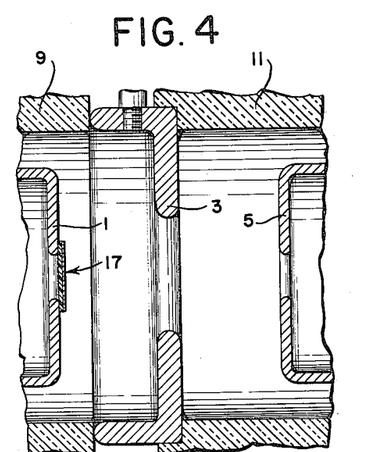
Fig. 4 is a fragmentary axial section through an overcorrected electron lens according to still another embodiment of the invention.
Figure 5:
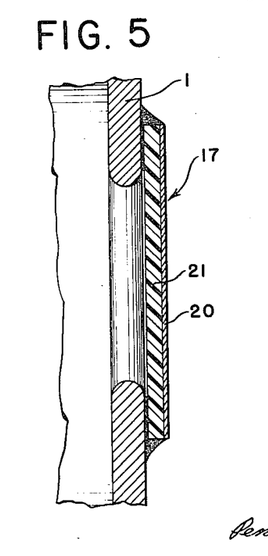
Fig. 5 is a fragmentary view at an enlarged scale of one of the electron permeable metallic films employed in the lens of Fig. 2.

The types illustrated in Figs. 3 and 4 are presently preferred to those of Figs. 1 and 2 respectively because of the reduction in electron scattering which they exhibit, and as between the embodiments of Figs. 3 and 4, that of Fig. 3 is presently preferred for the same reason.

The combination according to the invention of over- and undercorrected lenses having zero spherical aberration together is illustrated in Figs. 6–10.

Figure 6:
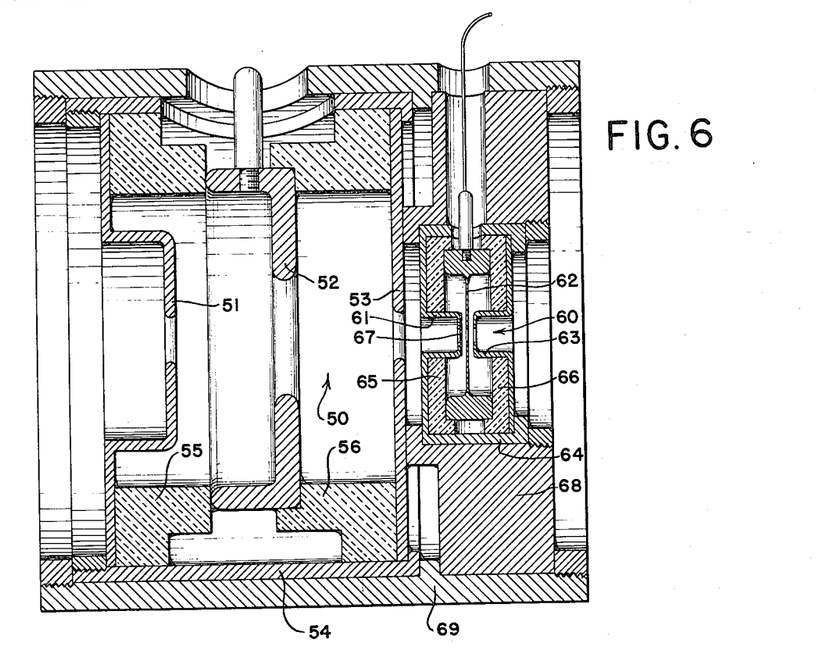
Fig. 6 is an axial section through a combination of separate convergent undercorrected and divergent overcorrected lenses producing a combination lens of zero spherical aberration according to the invention.

The lens combination of Fig. 6 includes an undercorrected convergent lens generally indicated at 50 and an overcorrected divergent lens generally indicated at 60. The convergent lens comprises apertured diaphragm electrodes 51, 52 and 53 supported coaxially in a lens cell 54, the center electrode 52 resting on insulating spacers 55 and 56. The corrector lens generally indicated at 60 comprises electrodes 61, 62 and 63 of which electrodes 62 and 63 are of the apertured diaphragm type. They are supported coaxially in a lens cell 64, the electrode 62 resting in insulating rings 65 and 66. In the corrector lens the electrode 61 nearest the convergent lens includes a fine mesh screen 67 extending across the lens axis and supported in electrically conducting relation with the remainder of the electrode which takes the form of an apertured diaphragm. The divergent correcting lens as a whole rests on a ring 68 which establishes an appropriate spacing therefor from the convergent lens. Both convergent and correcting divergent components are shown supported together in coaxial relation within a lens tube 69.

Figure 7:
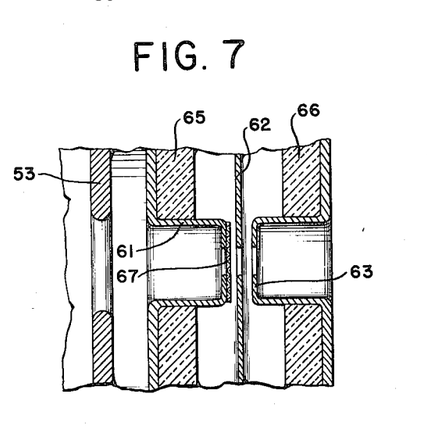
Fig. 7 is a fragmentary enlarged view of the corrected lens of Fig. 6.

The relation of the electrodes of the correcting component to each other and to the end electrode 53 of the convergent component is best seen in the enlarged fragmentary view of Fig. 7.

Figure 8:
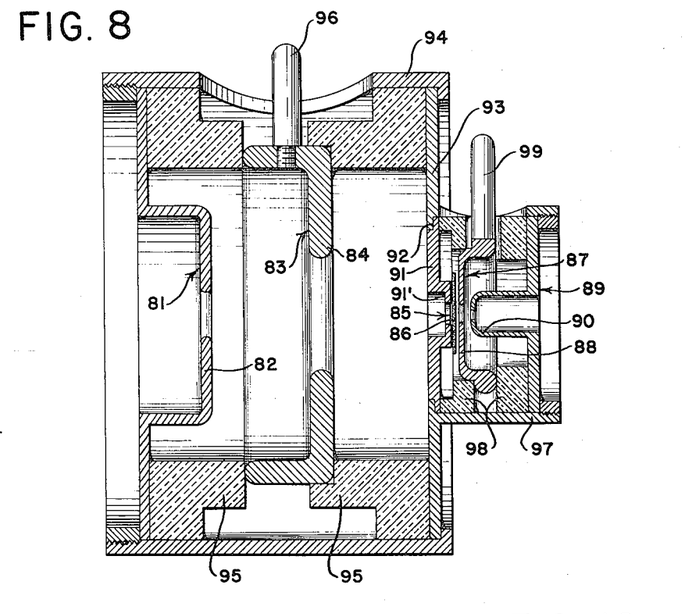
Fig. 8 is an axial section through another form of combined over- and undercorrected lenses according to the invention.

Another and presently preferred corrected lens combination according to the invention is illustrated in Fig. 8. The lens of Fig. 8 comprises a converging undercorrected component including electrodes generally indicated at 81, 83 and 85, and a diverging overcorrected or correcting component including electrodes generally indicated at 85, 87 and 89. In the undercorrected component the focus for marginal rays is closer than for paraxial rays, while in the overcorrected component the focus for marginal rays is farther than for paraxial rays. Both components thus suffer from spherical aberration, but of opposite sign.

Of the five electrodes in the lens of Fig. 8 all but the middle one, bearing reference character 85, are of the apertured diaphragm type, and are supported together coaxially. The convergent component provides positive power, with positive spherical aberration when its central electrode 83 is held at a negative potential with respect to its end electrodes 81 and 85, and the divergent component provides very low negative power with substantial negative spherical aberration when its central electrode 87 is held at a low positive potential with respect to its end electrodes 85 and 89.

The middle electrode 85 of the lens, which is common to both the converging and diverging components, is made up of a fine mesh screen 86 of conducting material such as copper supported, for example by means of an adhesive, in electrically conducting relation with the central portion 91' of a supporting apertured diaphragm 91. The screen 86 is preferably of very fine mesh in the sense that the openings of the mesh are small by comparison with the smallest aperture in any of the other electrodes of the lens. The screen should be flat and perpendicular to the axis of symmetry of the other electrodes, or otherwise rotationally symmetric in that axis. A screen having 750 meshes to the inch has been successfully employed. In order to preserve axial symmetry of the field within the lens the diaphragm 91 is also arranged to position its aperture symmetrically in the common axis of symmetry of the other electrodes. The diaphragm 91 rests at a shoulder 92 in an outer diaphragm 93 which fits within a lens cell 94. The electrodes 81 and 83 are also supported within the cell 94, the electrode 83 resting in rings of insulating material 95. A terminal 96 connects with the electrode 83 and passes through an opening in the sleeve for the application of a suitable potential to the electrode 83.

The electrodes 87 and 89 of the divergent correcting component are similarly supported within a cell 97, the former resting on insulating rings 98. The cell 97 is shown as formed integrally on the outer diaphragm 93. A terminal 99 permits the application of a suitable potential to the central electrode 87 of the divergent component. The electrodes 81, 85 and 89 thus have a common potential, and are usually although not necessarily grounded.

The apertured diaphragm electrodes 81, 83 and 93 have electron-optically significant central portions 82, 84 and 91 which are dimensioned as to thickness and as to the size and profile of the apertures therein according to criteria which are now well known in the art, in view of the focal length desired to be given to the converging component. The openings of the diaphragms 87 and 89 and their spacings from each other and from the electrode 85 are substantially smaller than the corresponding dimensions of the convergent component. This relative dimensioning of the divergent and convergent components permits the selection of potential conditions for which the spherical aberrations produced by the two components will be equal in magnitude but opposite in sign. It also makes it possible for the divergent component to accept as its object the image produced by the converging component, and vice versa, according as the lens is used with the convergent or divergent component facing the source of electrons.

A lens combination of the form shown in Fig. 8 which has been built and successfully operated possessed the following dimensions in inches:

| Diaphragm | Thickness | Diameter of Aperture | Spacing, Center Plane to Center Plane |
|---|---|---|---|
| 82 | 0.05 | 0.2 | diaphragms 82 and 84: 0.525. |
| 84 | 0.1 | 0.5 | diaphragms 84 and 91': 0.588. |
| 91' | 0.025 | 0.1 | diaphragms 91' and 88: 0.062. |
| 88 | 0.025 | 0.1 | diaphragms 88 and 90: 0.062. |
| 90 | 0.025 | 0.09 | |

This lens combination has been operated to show substantially zero spherical aberration in focusing a nearly parallel beam of electrons incident upon it from the side of the divergent component with the electrodes 81, 85 and 89 connected to ground while the cathode from which the electron beam is emitted was held at —10,000 volts. The center electrode 83 of the convergent component was operated at some —8,750 volts and the center electrode 87 of the divergent component was operated at +202 volts. With the electrode 87 at zero volts (ground) the lens showed undercorrection while with the electrode 87 at +405 volts the lens showed overcorrection. The lens exhibited a focal length of about 3.4 cm.

The over- or undercorrected character of the lens combinations of the invention may be tested by means of so-called Hartmann pictures in which an analyzing grating is positioned between the lens and a fluorescent screen. If the grating is positioned between the lens and its nominal focus, i. e. between the lens and the spread of crossovers on the lens axis, the shadow image of the grating on a fluorescent screen when the lens is illuminated with a parallel beam will exhibit pincushion distortion if the lens is undercorrected and barrel distortion if it is overcorrected. If the grating lies between the spread of crossovers and the screen, the association of the two types of distortion with the two types of spherical aberration is reversed. If the lens is free from spherical aberration, the shadow image is free of distortion for both positions of the grating.

Figure 9:
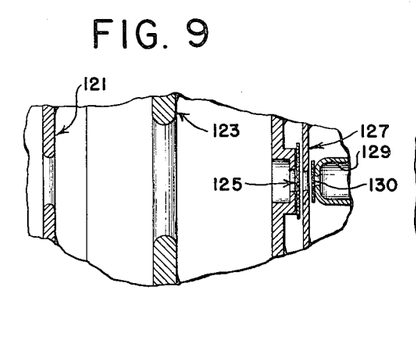
Fig. 9 is a fragmentary axial section similar to that of Fig. 8 but showing a further modification.

Fig. 9 illustrates fragmentarily still another lens combination according to the invention in which fine mesh screen electrodes are employed at both ends of the divergent component. In Fig. 9 the convergent component comprises electrodes 121, 123 and 125 similar to those of Fig. 8, and the divergent component comprises electrodes 125 and 127 similar to the electrodes 85 and 87 of Fig. 8. In place of the apertured diaphragm electrode 89 of Fig. 8 however, the lens of Fig. 9 includes a fine mesh screen 130 similar to the screen of electrode 125, supported on an apertured supporting diaphragm 129.

A lens of the type illustrated in Fig. 9, structurally the same as the lens of the type of Fig. 8 above referred to except for the addition of the screen 130 across the aperture of the electrode farthest from the convergent component, has been operated to show substantially zero spherical aberration in focusing a nearly parallel beam of electrons incident upon it from the side of the divergent component. In this lens with the electrodes 121, 125 and 129 at ground potential, with an accelerating potential of 10,500 volts (cathode at —10,500 volts) and with —9,187 volts on the electrode 123, the lens was free of spherical aberration when the center electrode 127 of the divergent component was operated at about +67 volts. With the electrode 127 at ground potential the lens was undercorrected, and with the electrode 127 at +135 volts the lens was overcorrected.

The lens combination according to Fig. 9 exhibited slightly greater focal length and focal distance than the lens according to Fig. 8, the focal length amounting to about 3.5 cm. The notable difference between the two however is that for the same potentials applied thereto otherwise, i. e. same accelerating potential and same potential on the center electrode of the convergent component, approximately three times as large a positive potential was required to be applied to the center electrode of the divergent component for the lens of Fig. 8 in order to achieve correction of spherical aberration. The embodiment of Fig. 8 is however the presently preferred one because, having only one mesh type electrode, a smaller scattering of the electron beam is produced. Moreover as to the screen electrode separating the convergent and divergent components, the potential is positive on one side of the screen and negative on the other. The electrical fields on the two sides of this screen are therefore in the same direction and partially cancel each other in their tendency to produce lens action in the mesh openings of the screen.

A lens combination according to Fig. 9 has also been successfully employed, at the same voltages as are set forth in the second preceding paragraph, with a projection lens in cascade therewith to form a real image of a real object at an over-all magnification of about 75, with a magnification of about 5 in the corrected combination and of about 15 in the projector. A fine mesh screen similar to the screens 125 and 130 was used as object, and the corrected lens combination was positioned with its convergent component facing the object. The image of this object produced by the corrected lens of Fig. 9 and by the projection lens in series therewith exhibited a definite focus and was substantially free of spherical aberration except for the contribution of the projection lens which was undercorrected.

The lens combinations of the invention can be used with either the convergent, undercorrected or with the divergent, overcorrected component presented to the source of electrons. The tests for spherical aberration above described were performed with the divergent component facing the electron source in order to benefit from the larger angular aperture exhibited by the lens on the side of the convergent component. The larger cone of electons diverging from the spread of crossovers following the lens when used in this orientation facilitated the detection of distortion in the shadow images of the test grating.

Figure 10:
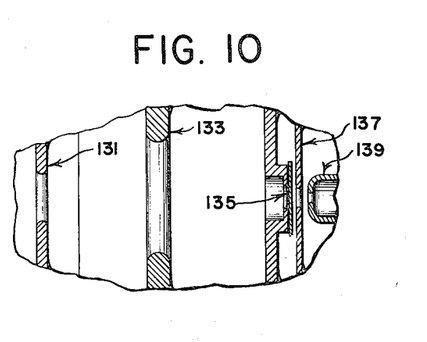
Fig. 10 is a fragmentary axial section similar to that of Fig. 8 but showing a further modification.

Fig. 10 illustrates fragmentarily still another lens according to the invention in which the middle electrode is provided with a substantially continuous electrically conducting but electron permeable surface across the lens axis by means of a metallic film in place of the screens employed in the embodiment of Figs. 8 and 9. This film is of the same type as that illustrated in Fig. 5.

A lens according to Fig. 10 and structurally the same as the lens according to Fig. 8 above discussed except for the change in the middle electrode has been operated to show substantially zero spherical aberration in focusing a nearly parallel beam of electrons incident upon it from the side of the divergent component. Zero spherical aberration was observed with its electrodes 131, 135 and 139 at ground potential, with the cathode from which the electron beam was emitted at −11,700 volts, with the center electrode 133 of the convergent element at −10,200 volts, and with the center electrode 137 of the divergent component at voltages between +1,000 and +1,200 volts. Lenses of the general type shown in Fig. 10 may also be provided with a conducting film over the aperture of the electrode in the divergent component farthest from the convergent component.

The criteria by which the convergent undercorrected lens and divergent overcorrected lens are selected in the embodiments of Figs. 6–10 will now be explained with reference to Figs. 11 and 12. These criteria are derived from certain properties theoretically attributed to the ideal hyperbolic lens illustrated in Fig. 12. It is to be emphasized that the argument now to be given has successfully served as a point of departure from which certain choices have been made in producing lens combinations of zero spherical aberration, but that the properties of such lens combinations depart widely, and favorably, in certain other respects from those which the analysis predicts, and that the lens and lens combinations of the invention do not include the hyperbolic lenses now to be discussed.

Fig. 12 is a sectional view of an ideal hyperbolic lens having three conducting electrodes A, B and C of infinite extent. When electrodes A and C are connected together and when a difference of potential is applied between A and C on the one hand and B on the other the potential within the volume enclosed by the electrodes will satisfy the equation $$V = k\left(z^2 - \frac{r^2}{2}\right) \tag{1}$$

This is the equation of the field whose potential has zero value at the origin of the coordinates $z$, $r$, and whose equipotential surfaces are the members of two conjugate families of hyperboloids of revolution. In Fig. 12 electrodes A and C are electron transparent and conform each to one of the two sheets of one biparted hyperboloid of one of these families. The other electrode B conforms to the single sheet of an unparted hyperboloid of the other family.

It is convenient to consider $k$ as positive and to refer to the intercepts of the two sheets of the biparted hyperboloid on the system axis as being both of the absolute value Z. The intercept of the unparted hyperbolic trace of the surface B in the $r$ axis of a meridian plane is R, considering for the moment rectangular coordinates $z$, $r$. If the voltage on the end electrodes is $V_1$, it has a value $$V_1 = kZ^2$$

and if the voltage on the center electrode is $V_2$, $$V_2 = -k\frac{R^2}{2}$$

If the electrodes are so selected that $$R = \sqrt{2}Z$$

then $$V_1 = -V_2$$

If $V_1$ is positive, the lens of Fig. 12 will have a convergent effect on a beam of electrons sent therethrough, and the convergence will suffer from positive spherical aberration. If $V_1$ is negative, the lens is divergent and overcorrected.

Figure 11:
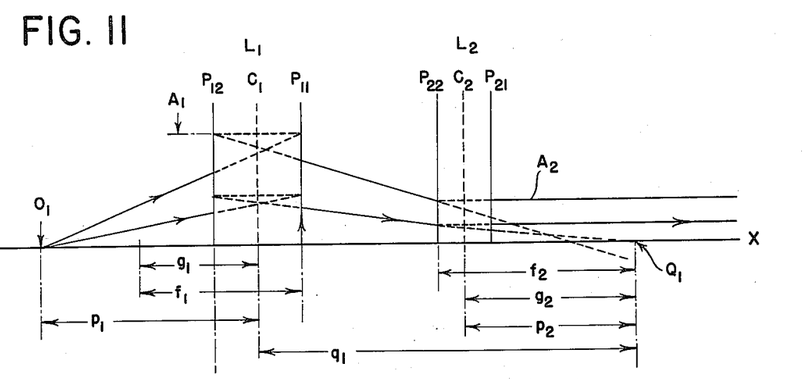
Fig. 11 is an optical diagram useful in explaining certain considerations from which combinations of lenses according to Figs. 5–10 may be constructed.

The combination of an ideal divergent overcorrected hyperbolic lens according to Fig. 12 with a three-electrode apertured diaphragm convergent undercorrected lens will be considered with reference to Fig. 11.

In Fig. 11 a three-electrode apertured diaphragm lens $L_1$ is diagrammatically indicated by means of its principal planes $P_{11}$ and $P_{12}$ and by means of its center plane $C_1$. The lens axis is indicated at X—X. For purposes of analysis this lens is to be combined with an ideal divergent overcorrected hyperbolic lens $L_2$ diagrammatically indicated by means of its principal planes $P_{21}$, $P_{22}$ and center plane $C_2$.

Electrons are shown diverging from an object point $O_1$ on the axis at a distance $p_1$ from the center plane $C_1$. The lens converges these rays to a point $Q_1$ on the axis at an image distance $q_1$ from the center plane $C_1$. The first focal point of $L_1$ is indicated in the figure as being distant a focal length $f_1$ from the first principal plane and distant a focal distance $g_1$ from the center plane $C_1$. In order to effect correction of the spherical aberration of $L_1$ and in analogy to the operation of the combination at high magnification the hypothetical hyperbolic lens $L_2$ is positioned between $L_1$ and the image point $Q_1$ with the focal point of $L_2$ coinciding with $Q_1$. With this arrangement the rays from $O_1$ are diverged in $L_2$ and emerge therefrom in a parallel bundle. The problem is to select $L_1$ and $L_2$ so that the spherical aberration of $L_1$, which may be written $\Delta q_1$, is equal and opposite to the spherical aberration of $L_2$, which may be written as $\Delta q_2$, and further to provide that the lenses can be physically positioned so that their principal planes will occupy the relative positions indicated by Fig. 11.

For a thick lens the variation in the image distance $q$ from the center plane for an object at a distance $p$ from that center plane can be written in terms of the magnification $m$ and focal distance $g$ as follows:

$$dq = 2mdf + (1+m^2)dg \tag{2}$$

The spherical aberration of $L_1$ may therefore be written:

$$\Delta q_1 = 2m_1 \Delta f_1 + (1+m_1^2)\Delta g \tag{3}$$

The spherical aberration $\Delta f_1$ in focal length of the three-plate lens $L_1$ may be written:

$$\Delta f_1 = -C_{f1}\frac{A_1^2}{f_1} \tag{4}$$

in which $C_{f1}$ is the spherical aberration coefficient in focal length of $L_1$ and in which $A_1$ is the intercept height of the ray in question (i. e. as distinguished from a paraxial ray) at the principal planes of the lens. Similarly the variation in focal distance of $L_1$ with ray height may be written:

$$\Delta g_1 = -C_{g1}\frac{A_1^2}{f_1} \tag{5}$$

in which $C_{g1}$ is the spherical aberration coefficent in focal distance of $L_1$. This permits rewriting Equation 3 in the following form:

$$\Delta q_1 = -[2m_1 C_{f1} + (1+m_1^2)C_{g1}]\frac{A_1^2}{f_1} \tag{6}$$

The spherical aberration properties of the hypothetical hyperbolic lens $L_2$ may be defined in terms of somewhat similar coefficients by the equations:

$$\Delta f_2 = \sigma_{f2}\frac{A_2^2}{Z_2} \tag{7}$$

and $$\Delta g_2 = \sigma_{g2}\frac{A_2^2}{Z_2} \tag{8}$$

in which $\sigma_{f2}$ is the spherical aberration coefficient of focal length, and $\sigma_{g2}$ is the spherical aberration coefficient in focal distance of $L_2$, $Z_2$ being however the axial intercept of the end electrodes. The focal length $f$ and focal distance $g$ of such a hyperbolic lens may be written as follows:

$$f = f_0 + \sigma_f \frac{A^2}{Z} \qquad (9)$$

and $$g = g_0 + \sigma_g \frac{A^2}{Z} \qquad (10)$$

in which $f_0$ and $g_0$ are respectively the focal length and focal distance of the hyperbolic lens for paraxial rays.

In view of the relative positioning of $L_1$ and $L_2$ in Fig. 11, one may read from the figure by similar triangles the relation:

$$\frac{A_1}{A_2} = \frac{f_1(1+m_1)}{f_2} \qquad (11)$$

The condition for compensation of spherical aberration between $L_1$ and $L_2$ is that:

$$\Delta g_2 + \Delta q_1 = 0 \qquad (12)$$

Substituting into (8) the value of $A_2$ given by (11) and applying (12) gives:

$$\sigma_{g2} \frac{A_1^2 f_2^2}{f_1^2(1+m_1)^2} \cdot \frac{1}{Z_2} = -\Delta q_1 \qquad (13)$$

A second condition on the realization of a lens according to Fig. 11 may be written as follows:

$$|g_2| \leq q_1 - \frac{l_1}{2} - Z_2 - S \qquad (14)$$

in which $l_1$ is the length of the convergent lens measured between the end electrodes thereof, and $S$ is the physical separation elected to be provided between $L_1$ and $L_2$. Unless condition (14) is satisfied with $S$ greater than or equal to zero, the lenses cannot be physically positioned to relate their principal planes and the focal point of $L_2$ at the image point of $L_1$ according to Fig. 11.

The spherical aberration coefficients $C_{f1}$ and $C_{g1}$ of three-electrode apertured diaphragm lenses such as $L_1$ may be computed according to methods of the prior art from the parameters of such a lens including the following:

$D$ = minimum diameter of the aperture of the center electrode.
$l$ = inside length of the lens.
$d$ = thickness of the center electrode.
$V_L$ = lens voltage, or potential difference between the center and end electrodes.
$V_i$ = incident voltage or voltage through which the incident beam is accelerated, equal to difference between the cathode voltage and that of the end electrodes.

These properties permit inference of the focal length and focal distance of such a lens as well as inference of its spherical aberration coefficients.

A study of the properties of the theoretical lens of Fig. 12 shows that its spherical aberration coefficients $\sigma_{f2}$ and $\sigma_{g2}$ are functions of the ratio $$\frac{V_c}{V_1}$$

applying to that lens, and that its paraxial focal length and focal distance are functions of this ratio and of the physical size of the lens, in terms of its intercept half length $Z$. In this ratio $V_c$ is the voltage from which the electrons are accelerated, and $V_1$ is the voltage of the end electrodes of the lens, both referred to the zero level of the potential field of the lens defined by Equation 1. For a divergent hyperbolic lens the ratio $$\frac{V_c}{V_1}$$

has positive values. At high values for this ratio the spherical aberration coefficients of the diverging hyperbolic lens approach a common asymptotic value given by the relation:

$$\sigma_f = \sigma_g = \frac{V_c}{4V_1} \qquad (15)$$

Similarly at high values for the ratio $$\frac{V_c}{V_1}$$

the paraxial focal length and focal distance of the diverging hyperbolic lens approach a common asymptotic value given by:

$$f_0 = g_0 = -Z\left(\frac{V_c}{V_1} - 1\right) \qquad (16)$$

Applicant has found that solutions of the relation (13) are found for high values of the ratio $$\frac{V_c}{V_1}$$

By postulating a high value for $$\frac{V_c}{V_1}$$

the asymptotic values may be employed for the spherical aberration coefficient $\sigma_{g2}$ and for $f_2$.

After the spherical aberration $\Delta q_1$ in image distance of the convergent lens has been evaluated from (6) (with a suitably selected $m_1$) in terms of a numerical coefficient times the ratio $$\frac{A_1^2}{f_1}$$

there remain in relation (13) as unknowns only the half length $Z_2$ of $L_2$ and (implicit in $\sigma_{g2}$) the voltage ratio $$\frac{V_c}{V_1}$$

to be applied to $L_2$. The relations (13) and (14) may then be solved simultaneously to specify completely the properties of the hypothetical hyperbolic correcting lens.

In the production of a corrected lens combination according to the embodiments of Figs. 6 or 8–10, the invention then substitutes for the hyperbolic lens so computed a three-plate lens according to one of the embodiments of Figs. 1–4, applying to the analogous elements thereof but with certain changes the dimensions derived for the hyperbolic lens, and spacing the two three-plate lenses of the combination in accordance with the computation. The three-plate lens according to any of Figs. 1–4 so defined then corrects the spherical aberration of the three-plate lens $L_1$, with however only minor effect on its focal length.

The following computation which derives the values embodied in the design of particular lens combination according to Fig. 6 will serve as an example. In this lens combination the convergent lens 50 (Fig. 6) possesses the following significant parameters:

$D = 1.27$ cm.
$d = .318$ cm.
$l = 2.54$ cm.

When this lens component is operated at a lens ratio $$\frac{V_i}{V_L} = 1$$

it has the following further properties:

$f_1 = 2.0$ cm.
$g_1 = 1.8$ cm.
$C_{f1} = 15$
$C_{g1} = 12$

The subscript 1 is here applied simply to indicate that the values are those of the convergent lens element of the combination.

The convergent lens $L_1$ is assumed to be operated at unity magnification so that $m_1$ in Equation 6 has unity value. This assumption is made because as indicated in Equation 6, it minimizes the aberration $\Delta q_1$ to be compensated by the correcting lens. The results obtained with this assumption are approximately applicable even though the convergent lens is operated at higher magnifications up to the order of 10 for example. The assumption is however not a necessary one. When operated at unity magnification the lens possesses an image distance $$q_1 = f_1 + g_1 = 3.8 \text{ cm.}$$

Applying these values to relations (6) and (11) gives:

$$\Delta q_1 = -54\frac{A_1^2}{f_1} = -27A_1^2 \tag{16}$$

and $$A_2 = \frac{f_2}{4}A_1 \tag{17}$$

and applying the results to relation (13) gives:

$$\sigma_{s2}\frac{f_2^2}{Z_2} = 432 \tag{18}$$

If the corrector lens is assumed to be operated with a large value for $$\frac{V_c}{V_1}$$

the spherical aberration coefficient $\sigma_{s2}$ and the paraxial focal length and focal distance of the hyperbolic lens take on the following values:

$$\sigma_{s2} = \frac{V_c}{4V_1} = \frac{\gamma}{4} \tag{19}$$

say, with $$\gamma = \frac{V_c}{V_1}$$

and $$f_2 = g_2 = -Z_2(\gamma - 1) \tag{20}$$

The condition of aberration equality (13) then gives:

$$\frac{\gamma}{4}(-Z_2)^2(\gamma-1)^2\frac{1}{Z_2} = 432$$

or $$\gamma Z_2(\gamma-1)^2 = 1728 \tag{21}$$

and the physical condition of lens construction (14) gives:

$$|g_2| = Z_2(\gamma-1) \leq q_1 - \frac{l_1}{2} - Z_2 - S$$

or $$\gamma Z_2 \leq q_1 - \frac{l_1}{2} - S \tag{22}$$

If the inter-lens separation S is set equal to .712 cm. relation (14) takes on the value:

$$\gamma Z_2 \leq 3.8 - 1.27 - .712 = 1.82$$

Applying the limiting equality condition to relation (23) and solving simultaneously with (21) gives:

$$Z_2 = 0.057 \tag{24}$$

and $$\gamma = 31.7 \tag{25}$$

The length on the axis of the hypothetical hyperbolic lens is therefore indicated to be 0.114 cm. If the lens is to have the desirable ratio of unity between its end and middle electrode voltages $$\frac{V_2}{V_1} = -1 \tag{26}$$

the radius of the aperture in the center electrode must conform to the relation $$R = \sqrt{2Z} = 0.0805 \text{ cm.} \tag{27}$$

and the indicated voltage ratio is $$\gamma = \frac{V_c}{V_1} = 31.7 \tag{28}$$

Also $$\frac{V_i}{V_L} = -15.35 \tag{29}$$

The divergent component of the lens combination of the invention illustrated in Fig. 6 designed from this description is doubled in length to give the center electrode thereof, which is thin by comparison with the hyperbolic electrode, more influence on the beam. The invention therefore indicates a lens combination according to Fig. 6 in which, for a convergent component having the data above and with an inter-lens separation of 0.712 cm., the correcting component is characterized by a length of 0.228 cm. and an aperture in its center electrode of 0.161 cm.

A similar analysis was employed in the construction of a lens combination of the type shown in Fig. 8 which has been built and operated and whose dimensions are given hereinabove in connection with the description of Fig. 8. In this lens combination however the separation between the convergent and correcting components was set at a minimum. Relation (14) shows that by reducing the value of the lens separation S the predicted half length Z of the hypothetical hyperbolic lens can be increased when the limiting condition of equality is applied to this relation. Since the corrector lens is small at best, it is desirable to make it as large as possible for constructional reasons. In fact, the particular lens combination according to Fig. 8 as built was doubled in all dimensions from the figures given by the computation, which is summarized here as a further example of applicant's invention as applied to the production of lens combinations corrected for spherical aberration.

A convergent three-electrode apertured diaphragm lens was assumed having the following properties:

$$D = 0.635 \text{ cm.}$$
$$d = 0.159 \text{ cm.}$$
$$l = 1.27 \text{ cm.}$$

When operated at $$\frac{V_i}{V_L} = 1$$

this component was computed to have $$f_1 = 1.0 \text{ cm.}$$
$$g_1 = 0.9 \text{ cm.}$$
$$C_{s1} = 15$$
$$C_{s1} = 12$$

Assuming again the position of the convergent and correcting components as in Fig. 11 and again setting $$m_1 = 1$$

these data when applied to (6), (8), (11) and (12) give for (13) the value $$\sigma_{s2}\frac{f_2^2}{Z_2} = 216 \tag{30}$$

which is to be compared with (18) for the example previously considered.

Assuming again a large $$\frac{V_c}{V_1}$$

for the correcting component, Equations 19 and 20 apply again, and application of (13) gives $$\gamma Z_2(\gamma-1)^2 = 864 \tag{31}$$

in place of the value given by (21) in the previous example. For maximum size of the correcting component, S was set at a low value of 1.1 mm. and with unity magnification for the convergent component $$q_1 = f_1 + g_1 = 1.9 \text{ cm.}$$

from which (23) takes on the value $$\gamma Z_2 = 1.15 \text{ cm.} \quad (32)$$

Simultaneous solution of the last two equations gives:

$$\gamma = 28.5$$
$$Z_2 = 0.04 \text{ cm.}$$
$$\frac{V_i}{V_L} = -13.75$$
$$R = \sqrt{2} Z_2 = 0.0565 \text{ cm.}$$

Accordingly the indicated hyperbolic lens should have had a length on the axis of $$2Z_2 = 0.08 \text{ cm.}$$

and a central electrode aperture diameter of $$2R = 2\sqrt{2} Z_2 = 0.113 \text{ cm.}$$

Upon a doubling of the axial length of the non-hyperbolic three-plate correcting component over the axial length figure determined for the hypothetical hyperbolic component, the three-plate correcting lens of this design was given the following dimensions:

Axial length=0.16 cm.
Center electrode aperture diameter = 0.113 cm.

For constructional convenience the entire lens combination including both convergent and correcting components was however doubled in all dimensions. Thus the convergent lens had the following dimensions:

$$D = 1.27 \text{ cm.} = 0.5 \text{ in.}$$

(the diameter given for the aperture of diaphragm 84 in the table of dimensions set out above in connection with the description of Fig. 8).

$$d = 0.318 \text{ cm.} = 0.125 \text{ in.}$$

(approximately the value given in that table for the thickness of diaphragh 84)

$$l = 2.54 \text{ cm.} = 1 \text{ in.}$$

(approximately equal to the sum of the spacings given in that table for diaphragms 82 and 84 and diaphragms 84 and 91'). The convergent component when so doubled in dimensions and operated at $$\frac{V_i}{V_L} = 1$$

had its focal length and focal distance similarly doubled, but its spherical aberration coefficients remained unchanged.

The corresponding doubling for constructional reasons of the dimensions of the three-plate correcting lens gave for that lens an axial length of $$0.32 \text{ cm.} = 0.126 \text{ in.}$$

and a center electrode aperture diameter of $$0.226 \text{ cm.} = 0.09 \text{ in.}$$

The axial length of 0.126 in. is in close agreement with the sum of the spacings between diaphragms 91' and 88 and between diaphragms 88 and 90 given in the table, this sum amounting to 0.124 in. The dimension 0.09 in. agrees closely with the dimension 0.1 in. given in the table for the diameter of the aperture in diaphragm 88.

In the example above described of the successful operation of a particular lens combination according to Fig. 8, it was stated that the convergent component was operated with its center electrode at some —8,750 volts whereas the cathode was at —10,000 volts. This gives to the ratio $$\frac{V_i}{V_L}$$

of the incident voltage to the lens voltage a value 1.14 in place of the unity value on which the dimensions of this lens combination were worked out. This reduction in the lens voltage of the convergent component was made in order to make possible not only correction of the lens combination but some degree of overcorrection, and such overcorrection was in fact observed when the center electrode 87 of the correcting component was operated at 405 volts positive with respect to the grounded end electrodes.

In the analysis above given of the combination of a convergent three-electrode apertured diaphragm lens with a hypothetical divergent hyperbolic lens, from which the combinations of three plate non-hyperbolic lenses of applicant's invention are derived, the conditions for reduction of spherical aberration of the combination of apertured diaphragm and hyperbolic lenses to zero are set out in Equations 12 and 14. For overcorrection of the combination, Equation 12 must be replaced by the inequality:

$$\Delta g_2 > -\Delta q_1 \quad (33)$$

Equation 14 must however still be satisfied. The inequality 33 can be achieved for any design of lens combination according to the invention by increasing in the analysis the ratio $\gamma$ for the correcting component, defined in Equation 19, since this transforms into an appropriate inequality the relation of $\Delta q_1$ and $\Delta g_2$ which is expressed in Equation 21 for the lens design according to Fig. 6 and in Equation 31 for the lens design according to Fig. 8. This will be clear by considering the derivation above given of Equation 21 from Equation 12.

The increase in $\gamma$ besides producing an increase in $\Delta g_2$ also results in a smaller increase in $g_2$ which upsets the equality set forth in Equation 14. To preserve the condition of equality of Equation 14, which for the five-electrode lens combination according to Fig. 8 is embodied in Equation 32, it is possible to reduce $Z_2$ and hence the length of the three-plate correcting lens according to any one of Figs. 1–4 derived from this value of $Z_2$. This is however inconvenient since at best the correcting component is very small. It is however also possible to satisfy Equation 14, according to the increase in $\gamma$ to be applied, by increasing the right-hand member of Equation 14 and hence of the applicable Equation 23 (Fig. 6) or 32 (Fig. 8) by increasing $q_1$. The steps taken to increase $q_1$ must however be such as not to increase $\Delta q_1$, or at least not to increase it as much as $\Delta g_2$ is increased by the increase in $\gamma$ being made.

In the operation above described of the particular lens according to Fig. 8, $q_1$ was also increased by reducing the voltage difference applied between the electrodes of the convergent component from 10,000 volts to some 8,750 volts, in effect reducing the strength of that component and therefore reducing rather than increasing its magnification, on which $\Delta q_1$ directly depends. $q_1$ can also be increased of course without effect on $m_1$ by constructing the convergent lens to a larger scale.

The invention contemplates that by any one of these three methods the combination lenses of the invention may be provided with the capacity to exhibit over-all overcorrection.

I claim:

1. An electrostatic electron lens comprising three apertured diaphragm electrodes, means to support said electrodes with their apertures in a coaxial array with the middle one of said electrodes in electrical insulation from the others, and an electrically conductive electrically substantially continuous electron-permeable sheet supported across the aperture of one of the end electrodes of said array in electrically conductive relation with said one end electrode.

2. An electrostatic electron lens comprising three apertured diaphragm electrodes, means to support said electrodes with their apertures in a coaxial array with the middle one of said electrodes in electrical insulation from the others, and electrically conductive electrically substantially continuous electron-permeable sheets supported across the apertures of both of the end electrodes of said array in electrically conductive relation with said end electrodes.

3. An electrostatic electron lens comprising three apertured diaphragm electrodes, means to support said electrodes with their apertures in a coaxial array with the middle one of said electrodes in electrical insulation from the others, and a metallic screen supported across the aperture of one of the end electrodes of said array in electrically conducting relation with said one end electrode, said screen having a mesh small by comparison with the smallest aperture in any of said electrodes.

4. An electrostatic electron lens comprising three apertured diaphragm electrodes, means to support said electrodes with their apertures in a coaxial array with the middle one of said electrodes in electrical insulation from the others, and metallic screens supported across the apertures of both of the end electrodes of said array, said screens having meshes small by comparison with the smallest aperture in any of said electrodes.

5. An electrostatic electron lens comprising three apertured diaphragm electrodes, means to support said electrodes with their apertures in a coaxial array with the middle one of said electrodes in electrical insulation from the others, and a thin electron-permeable continuous metallic layer supported across the aperture of one of the end electrodes of said array in electrically conductive relation with said one end electrode.

6. An electrostatic electron lens comprising three apertured diaphragm electrodes, means to support said electrodes with their apertures in a coaxial array with the middle one of said electrodes in electrical insulation from the others, and thin electron-permeable continuous metallic layers supported across the apertures of both of the end electrodes of said array in electrically conductive relation with said end electrodes.

7. An electrostatic electron lens comprising three apertured diaphragm electrodes, means to support said electrodes coaxially with the center electrode thereof in electrical insulation from the end electrodes thereof, and a conductive electrically substantially continuous sheet supported across the aperture in one of said end electrodes in electrically conductive relation with said one end electrode.

8. An electrostatic electron lens capable of exhibiting negative power with overcorrection for spherical aberration, said lens comprising three apertured diaphragm electrodes, means supporting said electrodes in a coaxial array with the center electrode thereof in electrical insulation from the others, and a conductive electrically substantially continuous electron-permeable film supported across the aperture of one of the end electrodes of said array in electrically conductive relation with said one end electrode, said film lying against the face of said one end electrode adjacent said center electrode.

9. In combination, two electrostatic electron lenses each comprising three apertured diaphragm electrodes mounted coaxially with the center electrode in electrical insulation from the others, one of said lenses having a center electrode aperture diameter and an axial electrode spacing respectively smaller than the corresponding dimensions of the other of said lenses, means to support said lenses coaxially, and a conductive substantially electrically continuous electron-permeable sheet supported across the aperture of the electrode of said one lens adjacent said other lens.

10. An electrostatic electron lens comprising six electrodes possessing axial symmetry, the second and fifth of said electrodes counting from one end being of the apertured diaphragm type, means to support said second and fifth electrodes coaxially in electrical insulation from the others and from each other, and means providing a substantially continuous electrically conductive electron-permeable sheet across the axis of said second and fifth electrodes at the position of at least the fourth of said electrodes.

11. In combination, a first three-electrode electrostatic electron lens, a second three-electrode electrostatic electron lens of which one end electrode is substantially continuous across the lens axis, and means to support said lenses in coaxial relation.

12. In combination, six apertured diaphragm electrodes, means to support said electrodes in a coaxial array with the second and fifth thereof counting from one end of the array in electrical insulation respectively from the electrodes adjacent thereto, and an electrically conductive electron-permeable film disposed across the aperture of said fourth electrode.

13. An electrostatic electron lens combination capable of operating with substantially zero spherical aberration, said combination comprising two lenses each including three apertured diaphragm electrodes supported in a coaxial array with the middle electrode in electrical insulation from the other two, one of said lenses being characterized by a smaller inter-electrode spacing and a smaller center electrode aperture diameter than the other, said one lens having a conductive substantially continuous electron-permeable sheet supported across the aperture of one of its end electrodes in conductive relation with said end electrode, and means to support said lenses in coaxial relation at such a separation that the image point of the larger of said lenses for a chosen object point coincides substantially with the second principal focus of the smaller of said lenses.

14. In combination, two three-electrode apertured diaphragm electrostatic electron lenses, the second of said lenses having a smaller inter-electrode spacing and center electrode aperture diameter than the first, an electrically substantially continuous electron-permeable sheet supported across the aperture of one of the end electrodes of said second lens, and means to support said lenses coaxially at a predetermined spacing, said second lens having an axial length between its end electrodes approximately twice as great as, and a center electrode aperture diameter substantially equal to, respectively, the axial length on the axis and the center electrode aperture diameter of a hyperbolic lens designed to be spaced from the first lens by said predetermined spacing and to have when so spaced its second principal focus adjacent the image point of the first lens for a chosen object point, said hyperbolic lens having when operated as a divergent lens a negative spherical aberration substantially equal in magnitude to the positive spherical aberration of said first lens.

15. In combination, two three-electrode apertured diaphragm electrostatic electron lenses, the second of said lenses having a smaller inter-electrode spacing and center electrode aperture diameter than the first, an electrically substantially continuous electron-permeable sheet supported across the aperture of one of the end electrodes of said second lens, and means to support said lenses coaxially at a predetermined spacing, said second lens having an axial length between its end electrodes approximately twice as great as, and a center electrode aperture diameter substantially equal to, respectively, the axial length on the axis and the center electrode aperture diameter of a hyperbolic lens designed to be spaced from the first lens by said predetermined spacing and to have when so spaced its second principal focus adjacent the image point of the first lens for a chosen object point at which the first lens operates at substantially unity magnification, said hyperbolic lens having when operated as a divergent lens a negative spherical aberration substantially equal in magnitude to the positive spherical aberration of said first lens.

16. In combination, two three-electrode apertured diaphragm electrostatic electron lenses, the second of said lenses having a smaller inter-electrode spacing and center electrode aperture diameter than the first, an electrically substantially continuous electron-permeable sheet supported across the aperture of one of the end electrodes of said second lens, and means to support said lenses coaxially at a predetermined spacing, said second lens having an axial length between its end electrodes approximately twice as great as, and a center electrode aperture diameter substantially equal to, respectively, the axial length on the axis and the center electrode aperture diameter of a hyperbolic lens the aperture of whose center electrode is the $\sqrt{2}$ times its axial length, said hyperbolic lens being designed to be spaced from the first lens by said predetermined spacing and to have when so spaced its second principal focus adjacent the image point of the first lens for a chosen object point, said hyperbolic lens having when operated as a divergent lens a negative spherical aberration substantially equal in magnitude to the positive spherical aberration of said first lens.

17. In combination, two three-electrode apertured diaphragm electrostatic electron lenses, the second of said lenses having a smaller inter-electrode spacing and center electrode aperture diameter than the first, means to mount said lenses coaxially at a predetermined spacing, and a conductive electrically substantially continuous electron permeable sheet supported across the end electrode of said second lens adjacent said first lens, said second lens having an axial length between its end electrodes approximately twice as great as, and a center electrode aperture diameter substantially equal to, respectively, the axial length on axis and the center electrode aperture diameter of a hyperbolic lens whose center electrode aperture is the $\sqrt{2}$ times its axial length on axis, said hyperbolic lens being designed to position its second principal point adjacent the image point of the first of said lenses conjugate to a chosen object point for said first lens when said hyperbolic lens is spaced from said first lens by said predetermined spacing.

18. The method of rendering a three-electrode apertured diaphragm lens divergent and overcorrected for spherical aberration which comprises applying a substantially continuous electron-permeable sheet over the aperture of at least one of the end electrodes of said lens in electrically conductive relation therewith, and applying to the center electrode thereof a potential positive with respect to the end electrodes thereof.

19. The method of correcting the spherical aberration of a three-electrode apertured diaphragm lens which comprises placing in cascade therewith a second three-electrode apertured diaphragm lens having a substantially continuous electron-permeable sheet applied across the aperture in one of the end electrodes thereof, and applying to the middle electrode of said second lens a voltage positive with respect to the end electrodes of said second lens.

20. The method of correcting the spherical aberration of a convergent electron lens which comprises placing in cascade therewith a three-electrode apertured diaphragm electrostatic electron lens having a substantially electrically continuous electron-permeable sheet extending across the aperture in the end electrode thereof adjacent the lens to be corrected, and applying to the middle electrode of said three-electrode lens a voltage positive with respect to the end electrodes thereof.

21. An electrostatic electron lens comprising three apertured diaphragm electrodes, means to support said electrodes in a coaxial array in electrically insulated relation each from the other two thereof, an electron-permeable sheet electrode supported to extend across the axis of symmetry of said diaphragm electrodes between two of said diaphragm electrodes, the largest electrical discontinuities in said sheet electrode being small compared to the apertures of said diaphragm electrodes, and an electrode positioned on one side of the end diaphragm electrode of said array which is adjacent said sheet electrode, said side being opposite said sheet electrode.

22. An electrostatic electron lens comprising three apertured diaphragm electrodes, means to support said electrodes in a coaxial array in electrical insulation each from the other two thereof, a fourth electrode including an electron-permeable sheet whose largest electrical discontinuities are small compared to the smallest aperture in said diaphragm electrodes, means to support said sheet in position extending across the axis of said array between two of said diaphragm electrodes, means rendering said sheet electrically continuous with the end electrode of said array axially farthest therefrom, a fifth electrode positioned opposite the end electrode of said array adjacent said fourth electrode on the side of said end electrode opposite said fourth electrode, and means to render said fifth electrode electrically continuous with said fourth electrode.

23. An electrostatic electron lens comprising three apertured diaphragm electrodes, means to support said electrodes in a coaxial array in electrical insulation each from the other two thereof, a fourth electrode including a first electron-permeable sheet whose largest electrical discontinuities are small compared to the smallest aperture in said diaphragm electrodes, means to support said first sheet in position extending across the axis of said array between two of said diaphragm electrodes, means rendering said first sheet electrically continuous with the end electrode of said array axially farthest therefrom, a fifth electrode including a second electron-permeable sheet whose largest electrical discontinuities are small compared to the smallest aperture in said three diaphragm electrodes, means to support said second electron-permeable sheet in position extending across the axis of symmetry of said array at a position beyond the end electrode of said array which is adjacent said first electron-permeable sheet, and means to render said two electron-permeable sheets electrically continuous with each other.

24. An electrostatic electron lens comprising three apertured diaphragm electrodes, means to support said electrodes in a coaxial array in electrical insulation each from the other two thereof, a substantially continuous electron-permeable sheet electrode extending across the axis of symmetry of said array between two of said diaphragm electrodes, means to render said sheet electrode electrically continuous with the one of said three diaphragm electrodes axially farthest therefrom, a fifth electrode positioned beyond the end electrode of said array which is adjacent said sheet electrode, said fifth electrode being on the side of said end electrode opposite said sheet electrode, and means to render said fifth electrode electrically continuous with said sheet electrode.

25. An electrostatic electron lens comprising three apertured diaphragm electrodes, means to support said electrodes in a coaxial array in electrical insulation each from the other two thereof, a substantially continuous electron-permeable sheet electrode extending across the axis of symmetry of said array between two of said diaphragm electrodes, means to render said sheet electrode electrically continuous with the one of said three diaphragm electrodes axially farthest therefrom, a fifth electrode of apertured diaphragm type, said fifth electrode being supported coaxially of said array outside thereof on the side thereof adjacent said sheet electrode, and means to render said fifth electrode electrically continuous with said sheet electrode.

26. An electrostatic electron lens comprising three apertured diaphragm electrodes, means to support said electrodes in a coaxial array in electrical insulation each from the other two thereof, a first substantially continuous electron-permeable sheet electrode extending across the axis of symmetry of said array between two of said diaphragm electrodes, means to render said sheet electrode electrically continuous with the one of said three diaphragm electrodes axially farthest therefrom, a second substantially continuous electron-permeable sheet electrode extending across said axis of symmetry axially outside of said array on the side thereof adjacent said first sheet electrode, and means to render said second sheet electrode electrically continuous with said first sheet electrode.

27. An electrostatic electron lens comprising five apertured diaphragms, means to support said diaphragms in a coaxial array with the second and fourth thereof counting from either end of the array in electrical insulation from the first, third and fifth thereof, and a substantially continuous electrically conductive electron-permeable sheet positioned across the aperture in the third of said diaphragms in electrically conducting relation therewith.

28. An electrostatic electron lens comprising five apertured diaphragms, means to support said diaphragms in a coaxial array with the second and fourth thereof counting from either end of the array in electrical insulation from the first, third and fifth thereof, and substantially continuous electrically conductive electron-permeable sheets positioned across the apertures of the third and fifth of said diaphragms in electrically conducting relation therewith respectively.

29. An electrostatic electron lens comprising five apertured diaphragms, means to support said diaphragms in a coaxial array with the second and fourth thereof counting from either end of the array in electrical insulation from the first, third and fifth thereof, and a metallic screen having a mesh small compared to the smallest aperture of said diaphragms positioned across the aperture in the third of said diaphragms in electrically conducting relation therewith.

30. An electrostatic electron lens comprising five apertured diaphragms, means to support said diaphragms in a coaxial array with the second and fourth thereof counting from either end of the array in electrical insulation from the first, third and fifth thereof, and metallic screens having a mesh small compared to the smallest aperture in said diaphragms positioned across the apertures in the third and fifth of said diaphragms in electrically conducting relation therewith respectively.

31. An electrostatic electron lens comprising five apertured diaphragm electrodes, means to support said electrodes in a coaxial array with the second and fourth thereof counting from one end of the array in electrical insulation from the first, third and fifth thereof, and a thin electron-permeable electrically continuous metallic layer supported on an electron-permeable support, said metallic layer being disposed across the aperture of the third of said electrodes in electrically conducting relation therewith.

References Cited in the file of this patent

UNITED STATES PATENTS

| | | |
|---|---|---|
| 2,355,795 | Glass | Aug. 15, 1944 |
| 2,409,644 | Samuel | Oct. 22, 1946 |
| 2,410,863 | Broadway et al. | Nov. 12, 1946 |
| 2,431,113 | Glyptis et al. | Nov. 18, 1947 |
| 2,520,813 | Rudenberg | Aug. 29, 1950 |
| 2,545,595 | Alvarez | Mar. 20, 1951 |
| 2,547,415 | Silverman | Apr. 3, 1951 |
| 2,632,115 | Bruck | Mar. 17, 1953 |
| 2,644,906 | Bondley | July 7, 1953 |